United States Patent
Pedersen et al.

(10) Patent No.: US 11,163,520 B2
(45) Date of Patent: Nov. 2, 2021

(54) MULTIMEDIA EXPERIENCE ACCORDING TO BIOMETRICS

(71) Applicant: Sonos, Inc., Santa Barbara, CA (US)

(72) Inventors: Peter Pedersen, Seattle, WA (US); Michael Papish, Randolph Center, VT (US); Eric Clayton, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/437,816

(22) Filed: Jun. 11, 2019

(65) Prior Publication Data

US 2019/0347064 A1 Nov. 14, 2019

Related U.S. Application Data

(63) Continuation of application No. 15/274,466, filed on Sep. 23, 2016, now Pat. No. 10,318,233.

(51) Int. Cl.
*G06F 3/16* (2006.01)
*G06F 3/01* (2006.01)
(Continued)

(52) U.S. Cl.
CPC .............. *G06F 3/165* (2013.01); *G06F 3/011* (2013.01); *G06F 3/015* (2013.01); *G06F 3/167* (2013.01);
(Continued)

(58) Field of Classification Search
CPC .......... G06F 3/165; G06F 3/16; G06F 16/635; G06F 16/636; G06F 16/639; G06F 16/68;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

| EP | 1389853 A1 | 2/2004 |
|---|---|---|
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Duc Nguyen
*Assistant Examiner* — Alexander L Eljaiek
(74) *Attorney, Agent, or Firm* — Akerman LLP

(57) ABSTRACT

Disclosed herein are example techniques for multimedia experience based on biometric data. An example implementation may involve receiving first biometric data representing one or more first biological characteristics of an individual. After receiving the first biometric data, the example implementation may involve correlating the one or more first biological characteristics of the individual with a listening state of the individual. The example implementation may further involve receiving second biometric data representing one or more second biological characteristics of the individual. After receiving the second biometric data, the example implementation may involve determining that the one or more second biological characteristics corresponds to the one or more first biological characteristics. Based on the determination, the example implementation may involve initiating a playback setting corresponding to the listening state of the individual that was correlated with the one or more first biological characteristics of the individual.

24 Claims, 7 Drawing Sheets

(51) Int. Cl.
*G06K 9/00* (2006.01)
*H04L 29/08* (2006.01)
*H04L 12/58* (2006.01)

(52) U.S. Cl.
CPC .......... *G06K 9/00892* (2013.01); *H04L 51/32* (2013.01); *H04L 67/306* (2013.01)

(58) Field of Classification Search
CPC ......... G06F 17/30752; G06F 17/30764; H04R 2227/005; H04R 3/12; H04L 65/4076; H04L 12/2805; H04L 12/2827; H04L 12/2838; H04L 12/2854; H04L 2012/2849
USPC .............................................. 700/94; 709/231
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,269,092 | B2 | 9/2012 | Terauchi et al. |
| 8,483,853 | B1 | 7/2013 | Lambourne |
| 10,318,233 | B2* | 6/2019 | Pedersen .................. G06F 3/165 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2014/0277649 | A1* | 9/2014 | Chong .................... G06F 3/165 |
| | | | 700/94 |
| 2015/0168996 | A1* | 6/2015 | Sharpe ................. G06F 21/316 |
| | | | 700/73 |
| 2015/0317465 | A1* | 11/2015 | McCarty ............. G06F 21/6218 |
| | | | 726/19 |
| 2016/0234595 | A1 | 8/2016 | Goran et al. |
| 2016/0292269 | A1* | 10/2016 | O'Driscoll .............. G06F 16/60 |
| 2016/0339300 | A1* | 11/2016 | Todasco ................. G16H 40/63 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jun. 27, 2018, issued in connection with U.S. Appl. No. 15/274,466, filed Sep. 23, 2016, 19 pages.
Notice of Allowance dated Jan. 30, 2019, issued in connection with U.S. Appl. No. 15/274,466, filed Sep. 23, 2016, 9 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

MULTIMEDIA EXPERIENCE ACCORDING TO BIOMETRICS

CROSS-REFERENCE TO RELATED APPLICATIONS

This application claims priority under 35 U.S.C. § 120 to, and is a continuation of, U.S. non-provisional patent application Ser. No. 15/274,466, filed on Sep. 23, 2016, and entitled "Multimedia Experience According to Biometrics," which is incorporated herein by reference in its entirety.

The present application incorporates herein by reference the entire contents of (i) U.S. application Ser. No. 15/098,867, filed Apr. 14, 2016, titled "Default Playback Device Designation," (ii) U.S. Pat. No. 8,234,395, filed Apr. 1, 2004, titled "System and method for synchronizing operations among a plurality of independently clocked digital data processing devices," (iii) U.S. application Ser. No. 13/340,126, filed Dec. 29, 2011, titled "Sound Field Calibration Using Listener Localization," (iv) U.S. application Ser. No. 15/131,244, filed Apr. 18, 2016, titled, "Metadata exchange involving a networked playback system and a networked microphone system," and (v) U.S. application Ser. No. 13/338,724, filed Dec. 28, 2011, titled, "Methods and Systems to Select an Audio Track."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
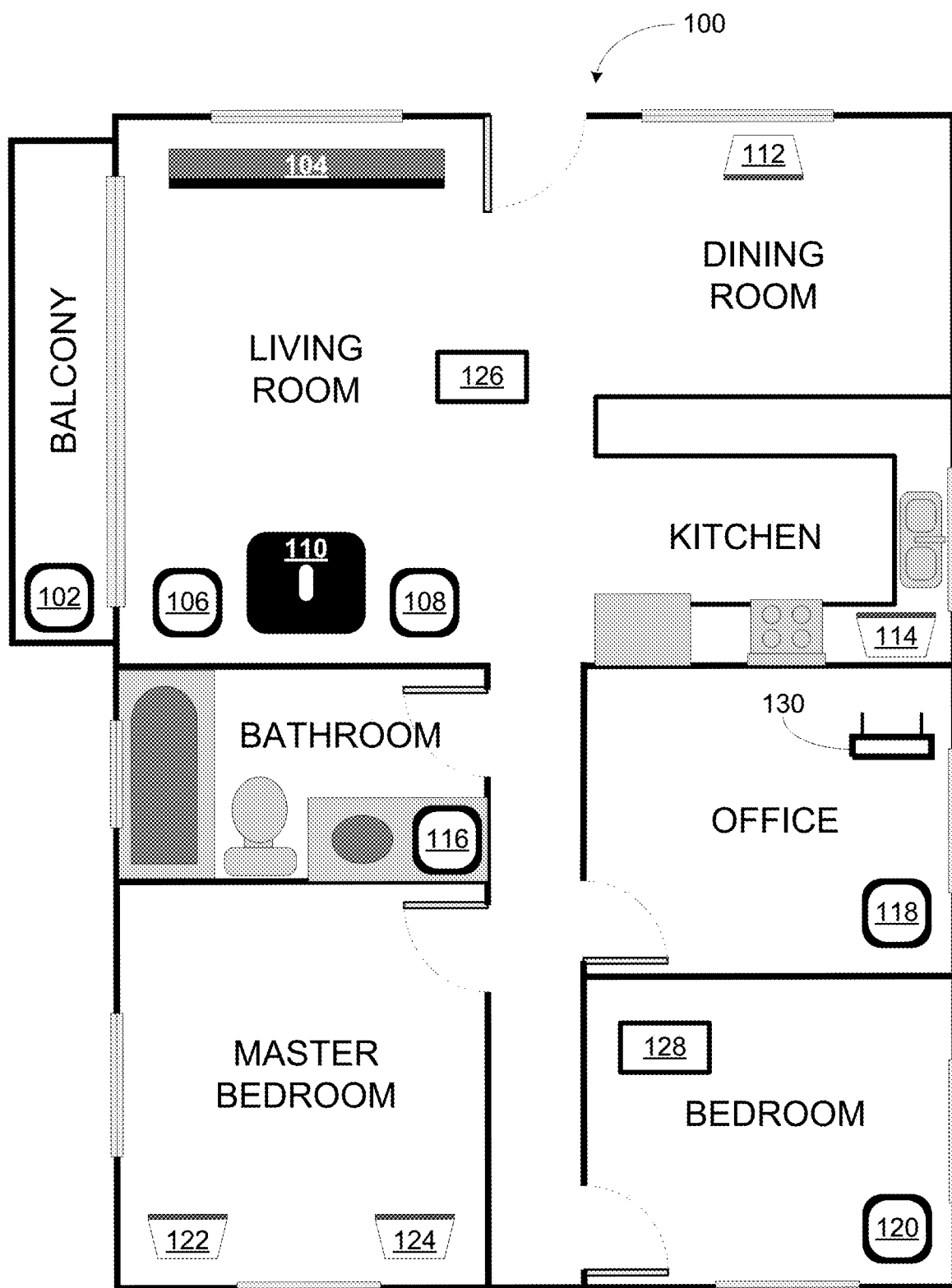
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Various control inputs, such as physical inputs at a controller device, voice commands, and other control inputs, may be used to control an audio playback device or media playback system, among other devices in a household (e.g., lights). For example, an individual may wish to change audio content, playlist, or listening zone, add a music track to a playlist or playback queue, or change a playback setting (e.g., play, pause, next track, previous track, playback volume, and EQ settings, among others) by way of a keyboard input, mouse input, touch input on a touch-sensitive display, and the like. In another example, an individual may use various voice commands. U.S. application Ser. No. 15/098,867 entitled, "Default Playback Device Designation," which is hereby incorporated by reference in its entirety, provides examples of voice-enabled household architectures.

Additionally, as passive sensors become more prevalent, it may be advantageous for an audio playback device or media playback system to utilize such passive sensors to control and/or otherwise affect the media experience. In some instances, various biometric measurements of individuals may drive insights around individual interactions with an audio playback device or media playback system. Such biometric measurements may in turn ultimately be used to control and/or otherwise affect the media experience.

Some example implementations described herein may utilize biometric data and measurements of an individual to control media playback of a media playback system, and example implementations described herein may also involve the media playback system obtaining permission to receive and/or analyze an individual's biometrics. For instance, an individual may provide an indication to the computing device that the individual is opting into collection of biometric data of the individual.

Example implementations may involve a computing device receiving first biometric data representing one or more first biological characteristics of an individual (or multiple individuals) during a first time period. Example biometric data may include data corresponding to proximity/location, blood pressure, pulse, perspiration, blood oxygen level, an accelerometer, a gyroscope, an electrocardiogram, electromyography, temperature, a millimeter wave scanner, electromagnetic radiation, an infrared laser, a camera, a microphone, temperature, perspiration, among other possibilities. For instance, a weareable device (e.g., smart watch) might provide biometric data representing biological characteristics of the individual. The biometric data may be sent to the computing device continuously or collected over time and then sent to the computing device.

Additionally, the computing device may supplement the received biometric data with additional data from various sources. In some examples, the computing device may receive social media data gleaned from an individual's social media account to supplement the received biometric data. In other examples, the computing device may receive a user profile to supplement the received biometric data. User profiles may be shared between any of the devices described herein via a network interface. Example user profiles may include voice characteristics that include the tone or frequency of the particular user's voice, age, gender, and user history, among other information.

After receiving the first biometric data, the computing device may correlate the one or more first biological characteristics of the individual with a listening state of the individual. Example listening states might include a "lean-in" (i.e., attentive) listening state or a "lean-back" (i.e., inattentive) listening state. A listening state may be based on, for example, an individual's mood (e.g., happy, sad), location, activity level (e.g., running, sleeping), and/or the general mood or activity level of a particular environment (e.g., household, living room of a household). For instance, biological characteristics indicating that an individual is sleeping may be correlated to a "lean-back" or inattentive listening state.

In some instances, the computing device may correlate the one or more first biological characteristics with an individual's mood. In other instances, the computing device may correlate the one or more first biological characteristics with an individual's location and/or level of activity. Other examples are possible as well.

Multiple iterations of correlating a listening state with one or more biological characteristics may allow the computing device to create a biometric profile corresponding to the individual's characteristics. A given individual's biometric characteristics may be adaptively learned over time by repeatedly correlating listening states with one or more biological characteristics at different times.

After correlating the one or more first biological characteristics of the individual with a listening state of the individual, the computing device may receive second biometric data representing one or more second biological characteristics of the individual. In some cases, the computing device may determine that the one or more second biological characteristics correspond to the one or more first biological characteristics. Based on determining that the one or more second biological characteristics corresponds to the one or more first biological characteristics of the individual, the computing device may initiate a playback setting corresponding to the listening state that was correlated with the one or more first biological characteristics. For instance, if a user previously played a certain type of music while having a certain set of biological characteristics, the media playback system may play back that certain type of music when the user is again exhibiting that certain set of biological characteristics.

In further example implementations, the computing device may provide biometric data representing one or more biological characteristics of an individual to cloud services. Such biometric data of individuals may provide additional insights to cloud services to improve algorithms in recommending new media content or improving discovery of media content based on characteristics of the individual (e.g., current mood). In some cases, such biometric data may improve marketing and/or advertisements by tailoring such content to the characteristics of the individual. Example cloud services may include media service providers (e.g., Pandora® Radio, Spotify®, Slacker®, Radio, Google Play™, iTunes Radio), and smart device manufacturers (e.g., Nest®), among other cloud services.

While some examples described herein may refer to functions performed by given actors such as "individuals," "users," and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments. Moreover, the examples described herein may extend to a multitude of embodiments formed by combining the example features in any suitable manner.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
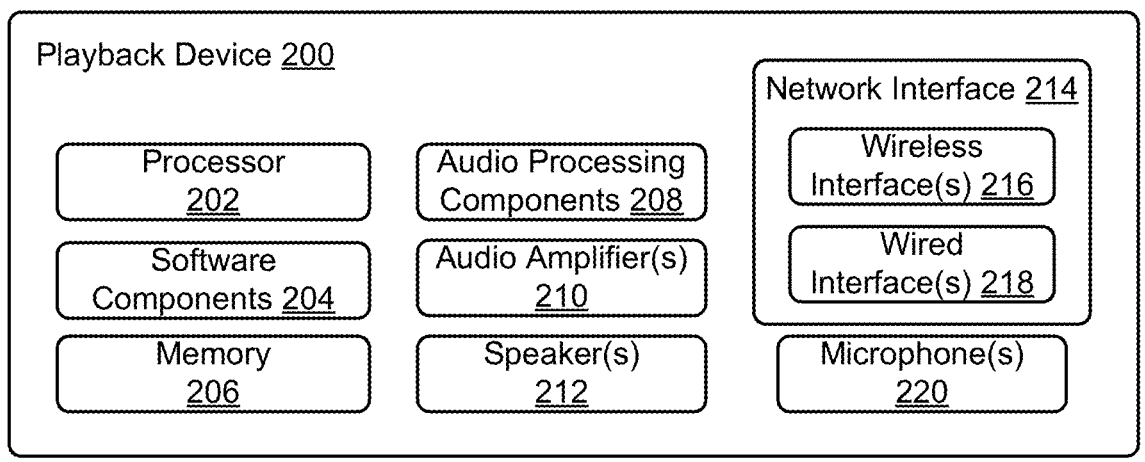
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference in its entirety, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s)) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not include the microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
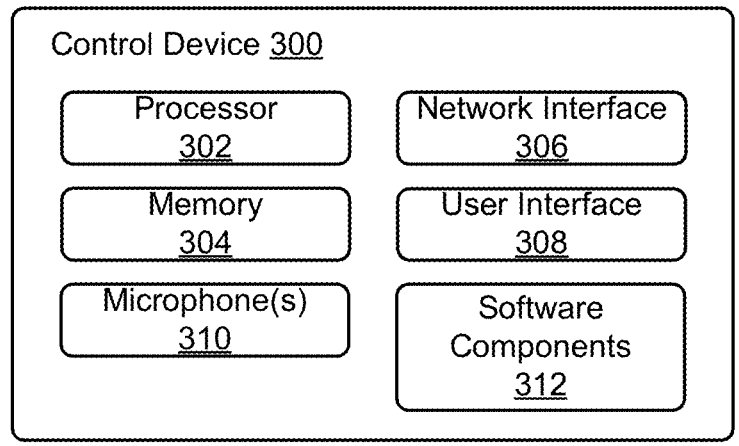
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
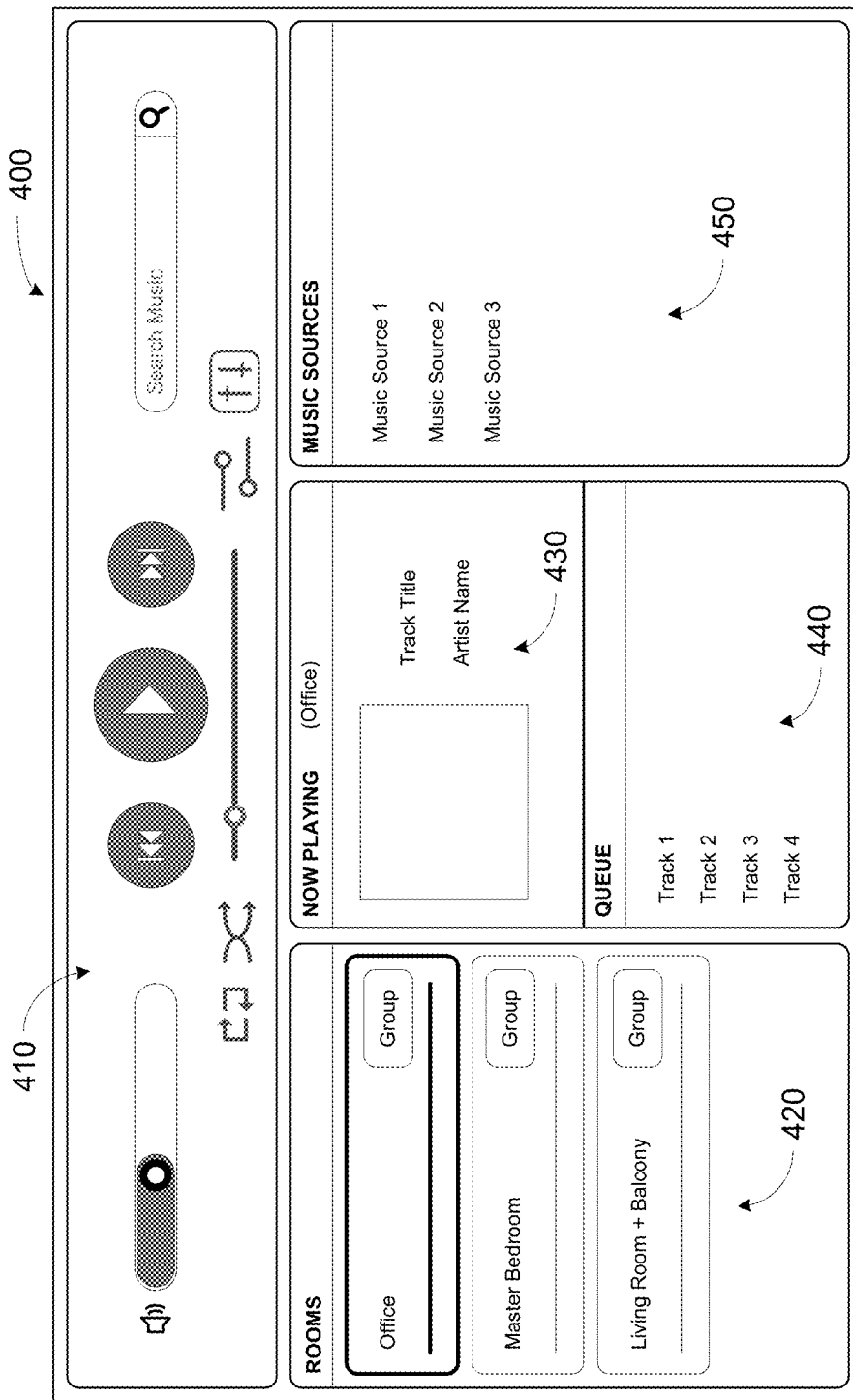
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
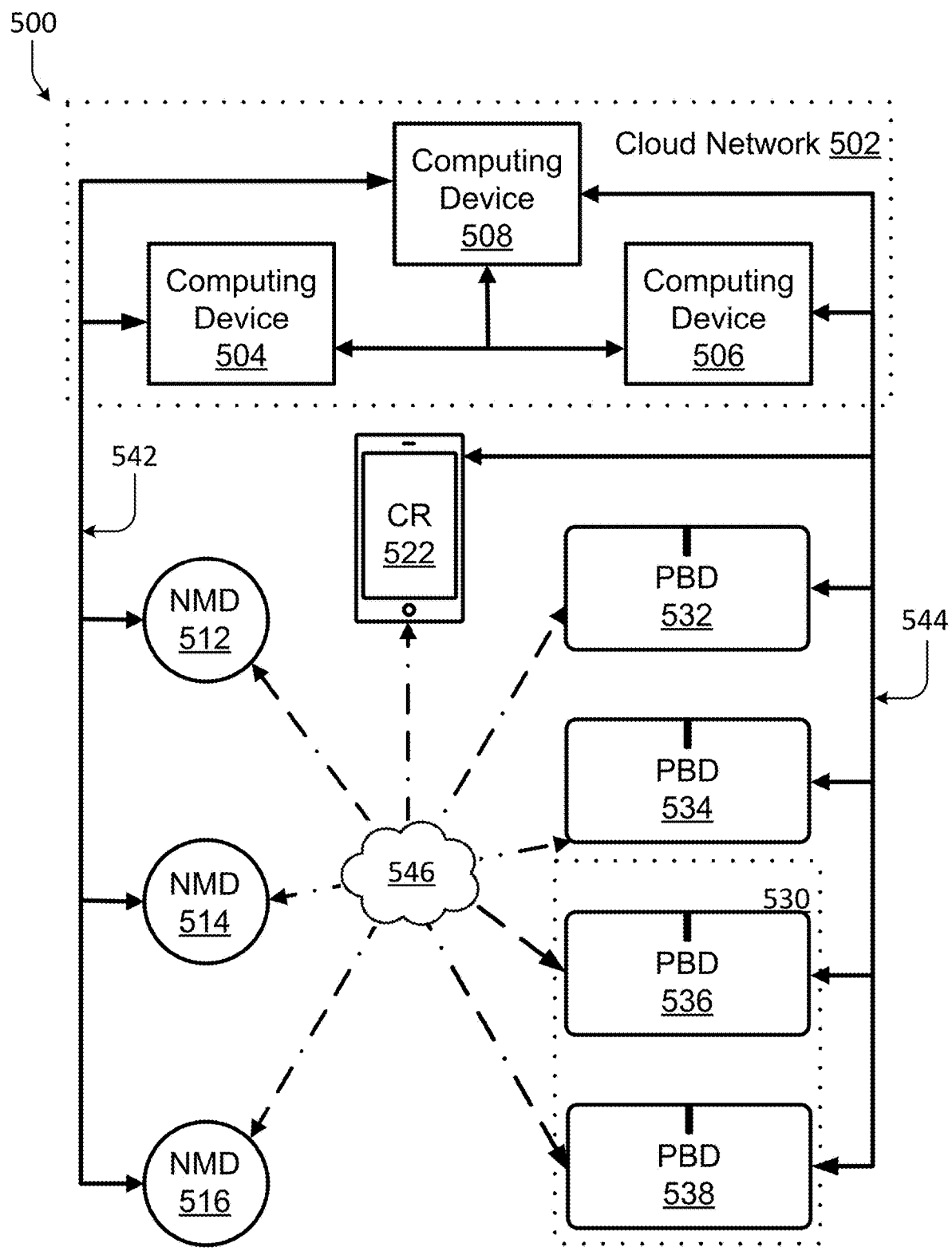
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300.

In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, a single access point may include communication paths 542 and 544. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
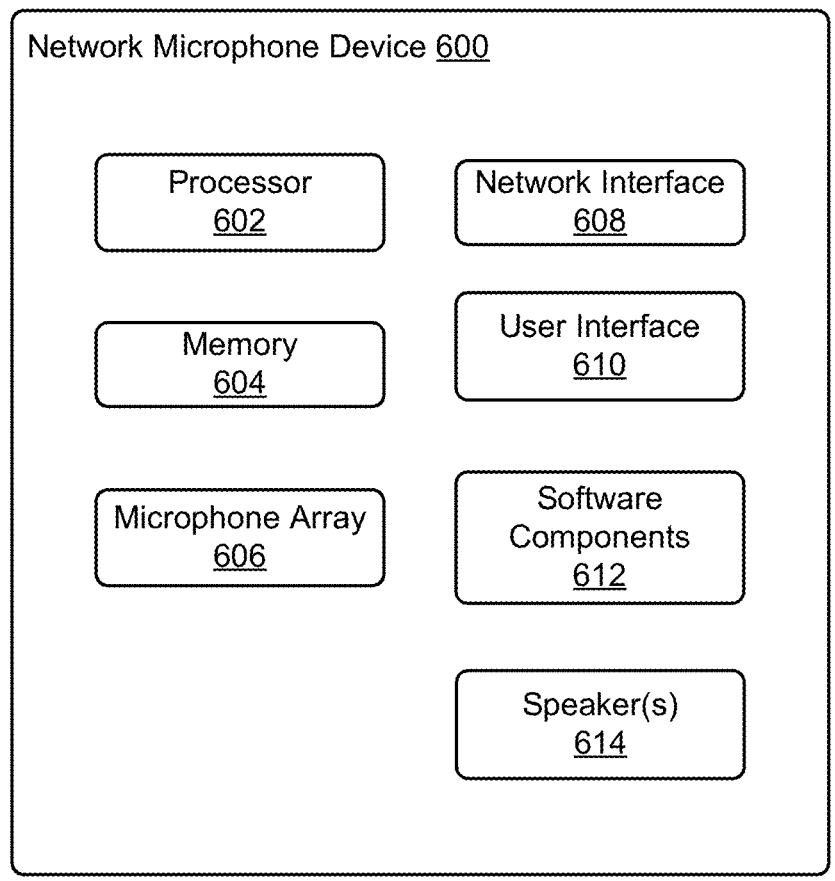
FIG. 6 shows a functional block diagram of an example network microphone device.

FIG. 6 shows a block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

g. Example Biometric Device

Figure 7:
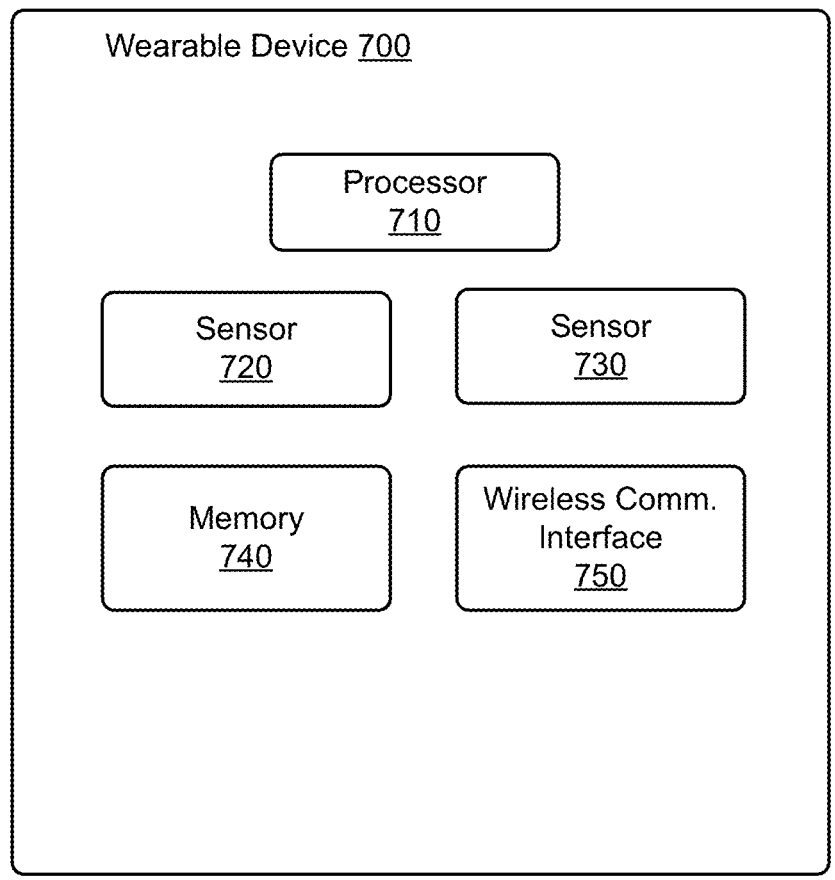
FIG. 7 shows a functional block diagram of an example wearable device.

FIG. 7 shows a block diagram of an example wearable device 700 that may be configured measure one or more characteristics, such as biological characteristics, of an individual wearing the device. Wearable device 700 may be, for example, a smart watch, glasses, fabric, contact lenses, headband, wristband, cap, or jewelry, among other devices that can be worn on the body of an individual. Biological characteristics may include, for example, the mental status (e.g., mood), physical status (e.g., sleeping, exercising), health conditions, and other characteristics that may be determined or inferred based on various biometric data detected via the wearable device 700.

As shown, wearable device 700 may include one or more processors 710 to determine one or more biological characteristics of an individual wearing the wearable device 700. Wearable device 700 may also include sensors 720-730 configured to obtain biometric data and memory 740 configured to store the biometric data. For example, sensors 720-730 may be configured to detect biometric data corresponding to various biological characteristics. Biometric data may include, for example, gender, weight, height, respiration, stress, fatigue, metabolic rate, calorie burn rate, sleep patterns, mental alertness, cholesterol level, lactic acid level, body fat, hormone level, muscle mass, blood pressure, pulse, perspiration, blood oxygen level, temperature (e.g., body, skin), cardiac rhythm and other data measured via an electrocardiogram and/or electromyography, and the like. Such biometric data may be used to determine or infer various biological characteristics of an individual.

In some examples, wearable device 700 may include a wireless communication interface 750 that can transmit biometric data to an external device, system, or server (e.g., CR 522, PBDs 532-538, computing device 504-508 in cloud network 502, and other network microphone devices). The wireless communication interface 750 may include, for example, Bluetooth, Wi-Fi, and/or any other wireless communication protocol. The biometric data transmitted by the wireless communication interface 750 may correspond to the measured one or more biological characteristics of an individual wearing the wearable device 700.

III. Example Systems and Methods for Multimedia Experience According to Biometrics As noted above, as passive sensors become more prevalent, a media playback system may utilize such passive sensors to control and/or otherwise affect media experience. In some instances, a media playback system may utilize various biometric measurements of individuals to control playback of a media playback system based on the biological characteristics of one or more individuals.

Generally, it should be understood that one or more functions described herein may be performed by a computing device individually or in combination with the media playback system server, networked microphone system server, PBDs 532-538, NMDs 512-516, CR 522, or any other devices described herein. Alternatively, the computing device itself may be integrated with the media playback system server, networked microphone system server, one of the PBDs 532-538, one of the NMDs 512-516, CR 522, or any other device described herein.

Figure 8:
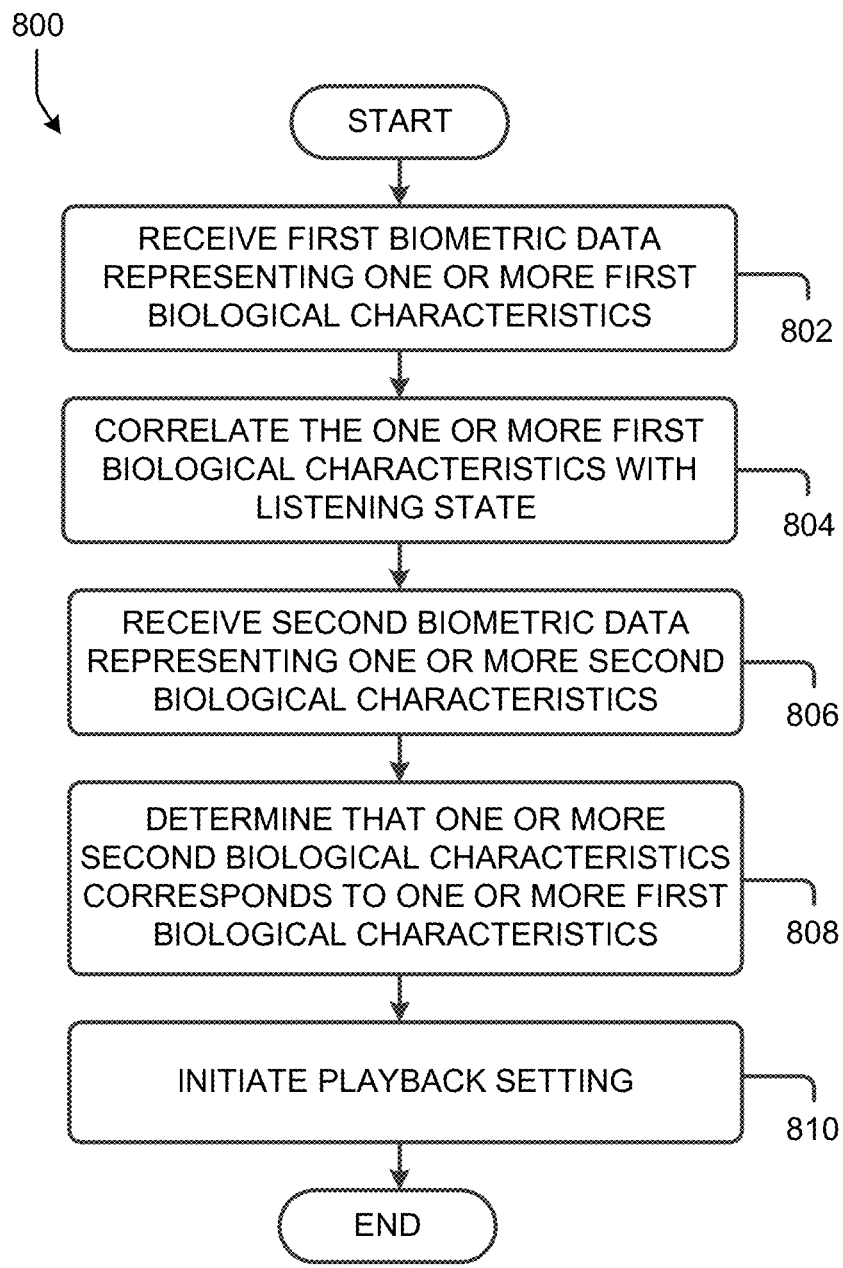
FIG. 8 shows a technique according to example embodiments.

Implementation 800 shown in FIG. 8 presents an embodiment of example techniques described herein. Implementation 800 can be implemented within an operating environment including or involving, for example, the media playback system 100 of FIG. 1, one or more playback devices 200 of FIG. 2, one or more control devices 300 of FIG. 3, the user interface of FIG. 4, and/or the configuration shown in FIG. 5. Implementation 800 may include one or more operations, functions, or actions as illustrated by one or more of blocks 802-810. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementation 800 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 800 and other processes and methods disclosed herein, each block in FIG. 8 may represent circuitry that is wired to perform the specific logical functions in the process.

a. Receive First Biometric Data Representing One or More First Biological Characteristics During First Time Period At block 802, implementation 800 involves receiving first biometric data representing one or more first biological characteristics during a first time period. For instance, a computing device may receive first biometric data representing one or more first biological characteristics of an individual (or multiple individuals) during a first time period. The computing device described herein may be, for example, computing device 506 (configured as a cloud-computing server) or one or more of PBDs 532-538, NMDs 512-516, CR 522, or any other device described herein.

In some embodiments, receiving the first biometric data representing the one or more first biological characteristics of the individual during the first time period may involve the computing device receiving the first biometric data from one or more wearable devices (e.g., wearable device 700) or mobile computing devices (e.g., smart phone). The computing device may receive the first biometric data over a network interface (e.g., wireless LAN or Bluetooth), and/or a wired interface, such as Universal Serial Bus (USB), among other interfaces generally known in the art. Within examples, the computing device may receive biometric data corresponding to various biological characteristics such as blood pressure, pulse, perspiration, blood oxygen level, temperature, electrocardiogram and/or electromyography, among other biometric data. Other biometric data may include data from sensors such as an accelerometer and/or a gyroscope, among other sensors that can be embedded into or otherwise connected to a wearable device or mobile computing device.

As noted above, receiving the first biometric data representing the one or more first biological characteristics of the individual may involve the computing device receiving the first biometric data from one or more sensors integrated with PBDs 532-538, NMDs 512-516, CR 522, or any other device described herein. In some implementations, the one or more sensors may include active sensors, such as GPS to detect the position or location of an individual, and infrared sensors to detect movement (or an individual) or control PBDs 532-538 and/or NMDs 512-516. In other implementations, the one or more sensors may include passive sensors that might reduce cost, power, and/or footprint of the sensors and/or devices described herein compared with active sensors. In some instances, one or more sensors may measure the position or location of an individual or a plurality of individuals in a given environment. U.S. application Ser. No. 13/340,126 entitled, "Sound Field Calibration Using Listener Localization," which is hereby incorporated by reference, provides example systems and methods to measure position of an individual or a plurality of individuals.

In other instances, the one or more sensors may utilize data corresponding to Bluetooth, a millimeter wave scanner, an infrared laser, electromagnetic radiation, a camera, or a microphone, among other possibilities. In some examples, the one or more sensors may include Bluetooth to detect proximity of an individual and a millimeter wave scanner to detect an individual's presence. In other examples, the one or more sensors may include an infrared laser light for depth-mapping. The computing device may construct a depth map by analyzing a speckle pattern or the infrared light, which may indicate the number and/or relative locations of individuals within a given environment represented by the depth map. In further examples, the one or more sensors may include one or more cameras that may include facial recognition technology that utilizes facial expressions to infer mood. In still further examples, the one or more sensors may include ambient temperature sensors to detect temperature of the surrounding environment. Other example sensors can be integrated with one or more devices described herein.

In some embodiments, the computing device may supplement the received biometric data with additional data from various sources. For instance, the computing device may receive social media data from an individual's social media account to supplement the received biometric data. For example, the computing device may receive social media data corresponding to an individual's social media status, comments, friends, news feed, likes, shares, check-ins, photos, groups, and events, among other data available via various social media services and applications. This type of data may be used to infer mood (e.g., happy), activity (e.g., studying), or occasion (e.g., birthday). In some cases, such data might not necessarily be used to supplement sensor data, but be used in lieu of the sensor data.

In other examples, the computing device may receive a user profile to supplement the received biometric data. User profiles can be shared between any of the devices described herein via respective network interfaces. Example user profiles may include voice characteristics that include the tone or frequency of the particular user's voice, age, gender, and user history, among other information.

In some embodiments, user history may include information specific to a particular individual. For example, user history may include an individual's location, proximity routines, motion history, movement routines, playback history, play settings, usage history, and search history, among other playback conditions, music properties, and/or habits corresponding to an individual. U.S. application Ser. No. 13/338,724 entitled, "Methods and Systems to Select an Audio Track," which is hereby incorporated by reference, provides further example conditions that may be included in a user profile.

Additionally, user history may include information corresponding to a particular environment. For example, user history may include information indicating that a particular media content was playing in a particular room in the household (e.g., living room in FIG. 1). Within examples, user history may include information indicating what playback settings were used when the particular media content was being played in the particular room in the household. Still within examples, user history may include information indicating the weather, time of day, and/or worldwide news events that occurred when the particular media content was being played. User history may be tied to a particular user profile (e.g., a user profile of a cloud service) to facilitate sharing of the user history among devices and/or services.

b. Correlate One or More First Biological Characteristics with Listening State

At block 804, implementation 800 involves correlating the one or more first biological characteristics with a listening state. For instance, the computing device may correlate the one or more first biological characteristics of the individual with a listening state of the individual. A listening state may be based on, for example, an individual's mood (e.g., happy, sad), location, activity level (e.g., running, sleeping), and/or the general mood or activity level of a particular environment (e.g., household, living room of a household). Additionally, a listening state may be based on weather, time of day, an event, or a playback setting or configuration setting of one or more PBDs 532-538 and NMDs 512-516.

In some implementations, a set of listening states may be pre-defined. Each pre-defined listening state may correspond to one or more biological characteristics. For instance, one pre-defined listening state may correspond to a happy mood. Another pre-defined listening state may correspond to both a happy mood and a high activity level (e.g., dancing). Another pre-defined listening state may correspond to (i) a happy mood, (ii) a high activity level, and (iii) the presence of multiple persons with similar moods and activity levels within a given environment. Yet further listening states may correspond to a calm mood, a low activity level (e.g., stationary for a given period), and/or a general calm mood and low activity level of nearby individuals. Many examples are possible.

Correlating the one or more first biological characteristics with a listening state may involve determining which particular listening state corresponds to the one or more first biological characteristics. Particular moods, activity levels, and/or other characteristics may be associated with respective thresholds. Biometric data indicating that a given threshold is exceeded may indicate that a certain characteristic is present (e.g., that an individual is in a certain mood or has a particular activity level). Exceeding one or more thresholds associated with a particular pre-defined listening state may indicate that the particular listening state is present.

As noted above, in some instances, the computing device may correlate the one or more first biological characteristics with an individual's mood. For example, after the computing device infers or determines that the individual is happy or in a celebratory mood, the computing device may correlate such a mood with the received one or more first biological characteristics. Similarly, in other instances, the computing device may correlate the one or more first biological characteristics with an individual's location and/or level of activity.

Multiple iterations of correlating a listening state with one or more biological characteristics may allow the computing device to create a biometric profile corresponding to the individual's characteristics. The individual's characteristics may be adaptively learned over time by correlating listening states with one or more biological characteristics. For example, the computing device may learn that a particular set of biological characteristics are repeatedly correlated with an individual playing a particular genre of music. If the computing device receives biometric data corresponding to the particular set of biological characteristics in the future, the computing device may infer or determine that the individual is likely listening to the particular genre of music (or would perhaps like to listen to that type of music).

The biometric profile corresponding to the characteristics of an individual may be compared with one or more other individuals. In some instances, biometric profiles may be cross-correlated between two or more individuals according to demographics. Such a comparison and/or cross-correlation between two or more individuals may, for example, allow the computing device to group particular individuals who like, dislike, or prefer particular media content.

As noted above, correlating the one or more first biological characteristics of an individual with a listening state of the individual may involve the computing device determining the listening state based on a level of activity of the individual in a given environment in which one or more playback devices are playing back media content. For example, the received first biometric data representing the one or more first biological characteristics of the individual may indicate that the individual is listening to media content while on a treadmill or exercising. The computing device may make such a determination based on, for example, the heart rate, step count, blood pressure, and/or blood oxygen level, among other biometric data. Based on such movement or level of activity, the computing device may determine the listening state.

In another example, the received first biometric data representing the one or more first biological characteristics of the individual may indicate that the individual is listening to media content while sitting at a particular location within a particular environment. For instance, the received biometric data may indicate that the individual is in a sitting position, perhaps on or near the living room couch, while listening to media content. Based on such an indication, the computing device may determine the listening state.

Within examples, based on the individual's level of activity, the computing device may determine whether the individual is in an attentive listening state or an inattentive listening state. An inattentive listening state may be, for example, a state in which the individual is not actively listening to a particular song or media content via PBDs 532-538. For instance, an individual who is on a treadmill, exercising, or moving around in a particular environment may be in an inattentive listening state. On the other hand, an attentive listening state may be, for example, a state in which the individual is actively listening to a particular song or media content via PBDs 532-538. For instance, an individual sitting at a particular location within a particular environment, perhaps to watch a movie or listen to a new album, may be in an attentive listening state.

Correlating the one or more first biological characteristics of an individual with a listening state of the individual may involve the computing device determining the listening state based on a noise level of the given environment. The computing device may receive biometric data corresponding to the noise level of the given environment (e.g., noise level detected via one or more microphones). For example, the computing device may receive data corresponding to a high noise level (e.g., treadmill, wind, loud conversation, people moving around (e.g., dancing) and may determine the listening state accordingly.

Within examples, based on the noise level of the given environment (and perhaps the individual's level of activity), the computing device may determine whether the individual is in an attentive listening state or an inattentive listening state. For instance, an individual may be in an attentive listening state when there is very little ambient noise. On the other hand, the individual may be in an inattentive listening state when there is a lot of ambient noise in the given environment.

In further embodiments, correlating the one or more first biological characteristics of an individual with a listening state of the individual may involve the computing device (i) determining a current mood of the individual based on the one or more first biological characteristics, and (ii) correlating the current mood of the individual with the listening state. In some examples, the computing device may infer that an individual is in a down mood based on the one or more first biological characteristics, which may indicate that the individual has poor posture and/or is moving slowly. The computing device may then correlate the mood with the listening state. In other examples, the computing device may infer that an individual is a happy or a positive mood based on facial recognition biometric data representing one or more first biological characteristics. The computing device may then correlate the mood with the listening state. In further examples, the computing device may infer a particular mood of an individual based on the tone of the individual's voice, level of activity, or social media content as noted above.

Correlating the one or more first biological characteristics of an individual with a listening state of the individual may involve the computing device determining a current mood or level of activity in a particular environment. In some instances, the computing device may determine the current mood or level of activity in a particular environment by determining the mood of one or more individuals in the household.

In some examples, the computing device may determine the current mood of a particular environment, such as a household, by determining the mood of one or more individuals in the household to infer an average mood in the household. For instance, referring back to FIG. 1 a first individual may be in a sitting position watching a movie in the Living Room, a second individual may be sleeping in the Master Bedroom, and a third individual may be working in the Office. The computing device may determine the mood of each individual in respective zones or rooms based on respective one or more biological characteristics of the individuals. Based on the mood of each individual in respective zones, the computing device may determine that the household is in a relaxed or calm mood.

In other examples, the computing device may determine the current mood, activity, or level of activity in the particular environment based on a combination of one or more biological characteristics of respective individuals and the time of day, events, weather, among other factors. In example operations, PBD 116 in the bathroom of FIG. 1 may include one or more sensors that detect biometric data, including proximity data. One or more individuals may be walking in and out of the bathroom early in the morning. The computing device may receive such biometric data from PBD 116, and based on the biometric data received from PBD 116, the computing device may determine that there is an increased level of activity in the bathroom early in the morning. Accordingly, the computing device may infer that the household is getting ready for the day, which might correspond to a particular playback state.

In other example operations, PBDs 122 and/or 124 may send biometric data to the computing device indicating that a first individual is sleeping in the master bedroom, and PBD 120 and/or control device 128 may send biometric data to the computing device indicating that a second individual is sleeping in the bedroom. As noted above, the computing device may determine that the family in the household is sleeping by taking the average mood of the first and second individual. Alternatively or for an additional level of confidence, the computing device may determine that the family in the household is sleeping based on determining that (i) it is late at night and (ii) the first and second individuals are in a resting state (e.g., slow movement and relatively low blood oxygen levels).

In further example scenarios, biological characteristics of individuals in a household may vary. For instance, PBDs 122 and/or 124 may send biometric data to the computing device indicating that a first individual is sleeping in the Master Bedroom. Concurrently, PBDs 106 and/or 108 in the Living Room may send biometric data to the computing device indicating that a second individual and a third individual have an increased level of activity and may be in an excited mood. The computing device may determine that the second and third individuals are having a party in the living room based on a combination of factors such as current events (e.g., Super Bowl), interests of the individuals (e.g., football), time of day, or calendar events of the individuals (e.g., scheduled events in the calendar of the respective individuals). The interests of the respective individuals and calendar events might be provided in the user profile or social media profile of the respective individuals.

In further examples, the computing device may anticipate the activity, activity level, or mood of the household based on a combination of factors such as interests of the individuals, time of day, current events, calendar events, and biological patterns of a given individual which may be included in a biometric profile. The biological patterns of a given individual in the household may be learned over time and may be correlated with certain activities within the household. In example operations, the computing device may anticipate that the family in the household will be sleeping or in a resting state during a particular time period (e.g., from 10:00 PM to 8:00 AM) based on the biological patterns of a given individual in the household. Additionally, for an additional level of confidence, the computing device may anticipate that the family in the household will be sleeping at a particular time at night based on determining that there are no calendar events (e.g., party) and/or current events (e.g. Super Bowl) that may be of interest to a given individual in the household.

Correlating the one or more first biological characteristics of an individual with a listening state of the individual may involve the computing device determining the listening state based on the individual's social media account or social media services in which the individual is subscribed. As noted above, the computing device may receive social media data gleaned from the individual's social media account to supplement the received biometric data. In some instances, based on the content of an individual's social media status, comments, or posts, the computing device may determine the individual's location or zone. For example, the individual may post, "I love spending time in my new basement," on one or more social media services that the individual is subscribed to. Based on the content of the individual's post, the computing device may infer that the individual is in the basement.

In other instances, based on the content of an individual's social media status, comments or posts, the computing device may determine the individual's mood. For example, the individual may post, "I ate a donut, life is good," on one or more social media accounts. Based on the content of the individual's post, the computing device may infer that the individual is happy or generally in a good mood. In another example, the individual may post an emoji, or provide an indication that the individual likes, loves, or dislikes another individual's social media status. Based on such social media activity of the individual, the computing device may infer the individual's mood accordingly.

In some examples, the computing device may infer the individual's mood based on comments or posts of another individual. Within examples, a particular individual may post, "I'm sorry for your loss," on an individual's profile or in a post in which the individual is tagged. Based on the content of the post, the computing device may infer that the individual is sad or generally in a somber mood. In another example, multiple individuals may be posting comments on one or more social media services to congratulate the individual. Accordingly, the computing device may determine that the individual is in a celebratory mood.

In further examples, the computing device may infer the individual's mood based on social media groups in which the individual is associated with, or particular individuals or groups in which the individual follows on one or more social media services. For example, the individual may be following a particular football team. After the particular football team beats another football team, the computing device may infer that the individual is happy or in a celebratory mood.

In further instances, based on the content of an individual's social media status, comments or posts, the computing device may determine the individual's level of activity. For example, the individual may post, "I had a long day at work," on one or more social media services. Based on the content of the individual's post, the computing device may infer that the individual is tired, exhausted, or low on energy.

In still further instances, based on the content of an individual's social media status, comments or posts, the computing device may predict or anticipate the individual's mood, activity level, and/or location. For example, the individual may post, "I can't wait to watch my favorite football team tomorrow with my friends in my new basement," on one or more social media services. Based on the content of the post, the computing device may infer that the individual will be in the basement tomorrow at a particular time to watch a particular football team play. The computing device may further infer that that the individual will generally be in an excited mood at the particular time.

In another example, the individual may post, "Today was exhausting. I'm going to sleep in until noon tomorrow," on one or more social media services. Based on the content of the post, the computing device may infer that the individual will be in a resting mood or sleeping until noon tomorrow (which is perhaps later than the individual would otherwise be expected to sleep). Other examples of determining an individual's mood, location, and activity level based on social media data are possible.

In some embodiments, correlating the one or more first biological characteristics of an individual with a listening state of the individual may involve the computing device correlating the one or more first biological characteristics of the individual with the listening state of the individual in a user profile associated with the individual. As noted above, the computing device may receive a user profile to supplement the received biometric data.

c. Receive Second Biometric Data Representing One or More Second Biological Characteristic During Second Time Period At block 806, implementation 800 involves receiving second biometric data representing one or more second biological characteristics of the individual during a second time period. For instance, after correlating the one or more first biological characteristics of the individual with a listening state of the individual, the computing device may receive second biometric data representing one or more second biological characteristics of the individual.

The computing device may receive the second biometric data in the same or similar manner in which the computing device receives the first biometric data as described above. For instance, the computing device may receive the second biometric data from one or more wearable devices and/or from one or more sensors integrated with PBDs 532-538, NMDs 512-516, CR 522, or any other device described herein.

d. Determining that the One or More Second Biological Characteristics Corresponds to the One or More First Biological Characteristics At block 808, implementation 800 involves determining that the one or more second biological characteristics corresponds to the one or more first biological characteristics. For instance, after receiving the second biometric data representing one or more second biological characteristics, the computing device may determine that the one or more second biological characteristics corresponds to the one or more first biological characteristics.

As noted above, iterations of correlating a listening state with one or more biological characteristics may allow the computing device to create a biometric profile corresponding to the individual's biological characteristics. In some embodiments, after correlating the one or more first biological characteristics of the individual with the listening state of the individual, the computing device, such as computing device 506 (e.g., configured as a cloud computing server) may store the correlated data in a biometric profile within a user profile corresponding to the individual. In other embodiments, the computing device may cause PBDs 532-538, NMDs 512-516, CR 522, or any other device, system, or server described herein to store the correlated data corresponding to the individual.

After receiving the second biometric data representing one or more second biological characteristics, the computing device may compare the one or more second biological characteristics to the one or more first biological characteristics of the individual correlated with a listening state. In some embodiments, the computing device may determine that the one or more second biological characteristics corresponds to the one or more first biological characteristics. Based on the determination, the computing device may initiate an action at block 810 described in more detail herein.

In some examples, determining that the one or more second biological characteristics of a particular individual corresponds to the one or more first biological characteristics of the particular individual may involve the computing device determining the identity of the individual. The computing device may determine the identity of the individual among a plurality of biometric profiles of individuals that may be stored in the computing device or any other device described herein. In some instances, the computing device may distinguish the identity of the individual from other individuals based on biometric data associated with the heartbeat pattern or heart rate of the individual (e.g., electrocardiogram data). Each individual's heartbeat may be unique and each individual's heartbeat pattern may vary based on each individual's heart's size, shape, and position within the body.

In other embodiments, the computing device may determine that the one or more second biological characteristics does not correspond to the one or more first biological characteristics of the individual. In some examples, based on such determination, the computing device may correlate the one or more second biological characteristics of the individual with another listening state. The computing device may store or cause another device to store the correlated data in the biometric profile or user profile corresponding to the individual to continue to build upon a comprehensive biometric profile corresponding to the individual's characteristics.

Within examples, in some instances, the correlated data of the one or more second biological characteristics with a listening state may conflict with previously correlated data of the one or more first biological characteristics with the listening state. In particular, the respective biological characteristics may indicate that the individual is tired, but the respective biological characteristics may not match each other (e.g., slightly different blood oxygen level). In such instances, the computing device may update the biometric profile corresponding to the individual by replacing the previously correlated data between one or more first biological characteristics and a listening state with the correlated data between one or more second biological characteristics and the listening state. Alternatively, the computing device may associate, combine, and/or average each correlated data to build upon a comprehensive biometric profile corresponding to the individual.

e. Initiating Playback Setting Corresponding to the Listening State that was Correlated with the One or More First Biological Characteristics At block 810, implementation 800 involves initiating a playback setting corresponding to the listening state that was correlated with the one or more first biological characteristics. For instance, based on determining that the one or more second biological characteristics corresponds to the one or more first biological characteristics of the individual, the computing device may initiate a playback setting corresponding to the listening state that was correlated with the one or more first biological characteristics.

As noted above, a playback setting may include, for example, a setting to play or pause an audio track, play the next or previous audio track, modify the playback volume and/or EQ settings, among other settings that may be modified via the media playback system. For instance, a playback setting may include a setting to add audio tracks to a playlist or playback queue, remove or change the order of audio tracks in a playlist or playback queue, modify one or more playback zones, initiate calibration of a playback device, or select content from a particular cloud service described in more detail herein.

In some embodiments, initiating a playback setting corresponding to the listening state that was correlated with the one or more first biological characteristics may involve the computing device causing one or more PBDs 532-538 to play back media content in a given environment. In some examples, based on determining that the one or more first and second biological characteristics (i) correspond to each other and (ii) indicate that the individual is in a somber or sad mood, the computing device may cause one or more PBDs 532-538 to play media content that would cheer up the individual. Within examples, the individual may be in the living room of FIG. 1. Based on the location and mood of the individual, the computing device may cause PBDs 106 and 108 to play media content that would cheer up the individual.

In other embodiments, initiating a playback setting corresponding to the listening state that was correlated with the one or more first biological characteristics may involve the computing device causing one or more PBDs 532-538 and/or NMDs 512-516 to adjust a listening setting. In some examples, based on determining that the one or more first and second biological characteristics (i) correspond to each other and also (ii) indicate that the individual is in an attentive listening state, the computing device may cause PBDs 532-538 and/or NMDs 512-516 (e.g., those that are in the zone of the individual or proximate to the individual) to tune for attentive listening. In some instances, the computing device may cause PBDs 532-538 and/or NMDs 512-516 that are in the zone of the individual to amplify sound in the direction of the individual and attenuate sound in other directions. Additionally, the computing device may steer one or more microphones of respective PBDs 532-538 and/or NMDs 512-516 in the direction of the individual to listen for additional voice commands from the individual. In other instances, the computing device may optimize one or more equalization settings of PBDs 532-538 and/or NMDs 512-516 for critical listening within the particular environment in which the individual is located.

In other examples, based on determining that the one or more first and second biological characteristics (i) correspond to each other and (ii) indicate that the individual is in an attentive listening state, the computing device may cause CR 522 to display recommended media content that the individual may enjoy. The recommend media content may be determined based on the media content that is currently playing and/or the current mood of the individual. In some instances, the computing device may generate a new playlist that includes a plurality of recommended media content that the individual may enjoy. In other instances, the computing device may add recommended media content that the individual may enjoy to a playback queue in order to cause one or more PBDs 532-538 to play the recommended media content following the current media content.

In further examples, based on determining that the one or more first and second biological characteristics (i) correspond to each other and (ii) indicate that the individual is in an inattentive listening state, the computing device may cause PBDs 532-538 and/or NMDs 512-516 that are in the zone of the individual or proximate to the individual to tune for inattentive or passive listening. For instance, the computing device may lower the volume or adjust the equalization settings of PBDs 532-538 and/or NMDs 512-516. Other types of playback control are possible as well.

In still further examples, based on determining that the one or more first and second biological characteristics (i) correspond to each other and (ii) indicate that the individual is in an inattentive listening state, the computing device may generate a new playlist that includes a plurality of media content for the individual. The plurality of media content may be chosen for passive listening. Within examples, the plurality of media content may be classic or well-known songs, or slower tempo songs, among other possible types of audio content.

In additional examples, the individual may provide an indication of whether the individual is in an attentive or inattentive state. In some instances, the individual may provide such an indication by selecting an input or setting displayed on a control device, such as CR 522. In other instances, the individual may provide such an indication by providing a voice command (e.g., "Hey Sonos, attentive listening."). The computing device (and/or one or more of NMDs 512-516) may receive the voice command and generate a new playlist that includes a plurality of media content. Additionally or alternatively, the computing device may add one or more media content to the playback queue in order to cause one or more PBDs 532-538 to play the one or more media content following the current media content that is playing.

In further embodiments, initiating a playback setting corresponding to the listening state that was correlated with the one or more first biological characteristics may involve the computing device keeping a status of one or more individuals in a household. Based on the status of one or more individuals in the household, the computing device may initiate a playback setting. For instance, if multiple individuals are in a certain listening state (e.g., inattentive), the computing device may initiate play back of media content corresponding to that state. As another example, if multiple individuals are in different listening states but located in different zones, the computing device may initiate respective playback settings for each zone. Many examples are possible.

In some examples, based on one or more biological characteristics of a given individual in a household, the computing device may keep a status table of the individuals who reside in the house or have a user profile associated with the household. In example operations, a first individual may be sleeping in the master bedroom in FIG. 1, a second individual may be awake in the living room, and a third individual may be outside, perhaps at work. Based on the biometric data representing one or more biological characteristics of each individual, the computing device may determine that the first and second individuals are in the household, while the third individual is not in the household. Additionally, the computing device may determine that the first individual is asleep, while the second individual is awake. Furthermore, the computing device may determine whether the second individual is in an attentive or inattentive listening state. Still further, the computing device may determine the current mood of the second individual (e.g., happy, sad). Based on the foregoing determinations, the computing device may generate and store a status table of the individuals.

In other examples, the computing device may update the status table based on a change in one or more biological characteristics of a given individual in a household. In example operations, the first individual that was sleeping in the master bedroom may have woken up, and the third individual who was outside the household may have returned. The computing device may determine that the first individual is awake and the third individual is available in the household. Additionally, the computing device may determine whether the first and third individuals are in an attentive or inattentive state. Furthermore, the computing device may determine the current mood of the individuals in the household. Based on the foregoing determinations, the computing device may update the status table.

In some instances, the status table may be displayed via CR 522. CR 522 may provide indications of the status of each individual. In some examples, CR 522 may display text and/or emojis indicating whether an individual is available, the current mood of an individual, level of activity of an individual, or any other information that may be extracted from one or more biological characteristics of an individual.

In further examples, the computing device may alert or cause another device (e.g., CR 522) to alert an individual that another individual has woken up. In example operations, a baby may have been asleep in the bedroom. When the baby wakes up, the computing device may cause CR 522 to alert the parent that the baby is awake. Within examples, the computing device may cause CR 522 to notify the parent that the baby is awake by providing a sound alert, vibration, or text notification, among other examples. Additionally or alternatively, the computing device may cause PBDs 532-538 and/or NMDs 512-516 to alert the parent that the baby is awake by providing a sound alert (e.g., playing particular media content, sound tones, or voice notifications).

In some embodiments, initiating a playback setting corresponding to the listening state that was correlated with the one or more first biological characteristics may involve the computing device causing the playback devices (e.g., PBDs 532-538) to play particular media content or preventing the playback devices from playing media content. In example operations, an individual may be playing media content via PBDs 122 and 124 in the master bedroom in FIG. 1. After a certain time period, the individual may fall asleep in the master bedroom. In response, the computing device may cause PBDs 122 and 124 to stop playing media content. Alternatively, the computing device may cause PBDs 122 and 124 to play different media content based on the individual's sleep cycle. In some instances, the computing device may cause PBDs 122 and 124 to play nature sounds or white noise while the individual is asleep.

When the individual wakes up, the computing device may cause PBDs 122 and 124 to start playing media content that was being played before the individual fell asleep. Alternatively, the computing device may cause PBDs 122 and 124 to start playing media content based on one or more biological characteristics of the individual and/or other factors, such as the time of day. In some examples, the computing device may cause PBDs 122 and 124 to play media content that would energize the individual. In other examples, the computing device may cause PBDs 122 and 124 to play media content that are typically on the individual's morning playlist based on the status of the individual (e.g., awake) and the time of day (e.g., morning).

In other example operations, based on the status of the individuals in the household, the computing device may cause some playback devices in the household to play media content, while preventing other playback devices in the household from playing media content. In particular, a first individual may be in the living room in FIG. 1 and a second individual may be asleep in the bedroom. The first individual may provide a voice command to an NMD in the living room or PBD 106 (which may be configured as an NMD). The voice command may be a command to play media content in every zone or room in the household (e.g., "Hey Sonos, play Michael Jackson in party mode."). Based on determining that the second individual is asleep in the bedroom, the computing device may prevent PBD 120 which in the bedroom from playing media content, while causing other PBDs in the household to play media content. Additionally, the computing device may tune the PBDs in the household to attenuate sound in the direction of the bedroom. In some instances, the computing device may reduce the volume of nearby PBDs (e.g., PBD 118 in the office and PBD 116 in the bathroom) and/or adjust the equalization settings throughout the household to reduce the bass level.

In further example operations, based on the status and location of the individuals in the household, the computing device may limit the number of zones or rooms that may be selected to play media content. In particular, a first individual may be in the living room in FIG. 1 and a second individual may be asleep in the bedroom. The first individual may wish to group multiple zones within the household via CR 522 to play media content throughout the multiple zones. Based on determining that the second individual is asleep in the bedroom, the computing device may prevent the first individual from selecting the bedroom zone via CR 522. In some instances, CR 522 may display the bedroom zone but may indicate that the bedroom zone is not selectable for playback because the second individual is asleep in the bedroom. In other instances, CR 522 may not display the bedroom zone. In further instances, CR 522 may separately display zones that are available and zones that are not available. Other example indications are possible.

IV. Example Systems and Methods for Multimedia Experience with Cloud Services According to Biometrics In further embodiments, the computing device may provide biometric data representing one or more biological characteristics of an individual to cloud services. The biometric data representing the one or more biological characteristics of the individual may correspond to cloud service content, products, and/or data. As noted above, such biometric data of individuals may provide additional insights to cloud services to improve algorithms in recommending new media content or improving discovery of media content and/or advertisements which may be tailored to particular individuals based on characteristics of the individual (e.g., current mood).

Example cloud services may include media service providers (e.g., Pandora® Radio, Spotify®, Slacker®, Radio, Google Play™, iTunes Radio), and smart device manufacturers (e.g., Nest®), among other cloud services. The computing device may provide biometric data to such cloud services by establishing a metadata exchange channel between the computing device and the cloud services. U.S. application Ser. No. 15/131,244 entitled, "Metadata exchange involving a networked playback system and a networked microphone system," which is hereby incorporated by reference in its entirety, provides examples of metadata exchange architectures.

In some instances, the computing device may provide unprocessed biometric data representing one or more biological characteristics of an individual to a cloud service. The cloud service may then make its own insights based on the received one or more biological characteristics of the individual. In other instances, the computing device may process the biometric data by, for example, correlating the one or more first biological characteristics of the individual with a listening state of the individual. The computing device may then send the correlated data to the cloud service.

In some embodiments, initiating a playback setting corresponding to the listening state that was correlated with the one or more first biological characteristics may involve the computing device sending a request for media content to a media service provider. In some instances, the computing device may send the request for media content with the received biometric data representing one or more biological characteristics of an individual. In other instances, the computing device may send the request for media content with the listening state of the individual that was correlated with the one or more first biological characteristics of the individual. After sending the request for media content, the computing device may receive the requested media content from the media service provider and cause one or more playback devices to play the media content. The requested media content may correspond to the listening state of the individual that was correlated with the one or more first biological characteristics of the individual.

In example operations, an individual may send a voice command to one of NMDs 512-516 to cause one or more of PBDs 532-538 to play media content (e.g., "Hey Sonos, play some music."). In response, the computing device may send a request for media content to a media service provider. In some instances, the computing device may send the request for media content with an indication of the individual's mood (e.g., sad, happy). In other instances, the computing device may send the request for media content with the received biometric data representing one or more characteristics of the individual to allow the cloud service to drive biometric insights and perhaps determine the mood of the individual. After sending the request for media content to the media service provider, the computing device may receive the requested media content and cause the one or more of PBDs 532-538 to play the received media content. As noted above, based on the status of the individuals in the household (e.g., sleeping or awake), the computing device may cause some of the PBDs 532-538 to play the received media content, while preventing other PBDs 532-538 from playing the received media content.

The received media content may be based on the individual's mood. In particular, if the individual is in a sad mood, the computing device may receive media content that might improve the individual's mood. Media content that may improve the individual's mood may include, for example, a station (e.g., radio station, playlist) that includes upbeat media content, or media content that the individual previously played and liked (e.g., provided a "thumbs up" indication).

In some embodiments, the computing device may facilitate discovery of media content based on biometric data representing one or more characteristics of the individual. In some examples, the computing device may determine that the individual reacted positively to a cloud service media content, product, and/or service based on the received biometric data representing one or more characteristics of the individual (e.g., facial recognition data, individual dancing, voice data indicating that the individual likes the current song that is playing). Additionally or alternatively, the computing device may determine that the individual moved from an inattentive state to an attentive state. The computing device may send such biometric data corresponding to the individual's mood and/or current state to one or more cloud services. In response, the one or more cloud services may provide advertisement content associated with the content, product, and/or service in which the individual reacted positively.

Within examples, the individual might have reacted positively to media content that is currently playing. The computing device may provide such data to the media service provider that provides such media content. After providing such data, the computing device may receive advertisement content tailored to the individual who reacted positively to the media content that is currently playing. In some examples, the computing device may receive data corresponding to the artist of the media content that is currently playing. The computing device may cause CR 522 to display such data. In some instances, the computing device may cause CR 522 to display such data when the individual is in an attentive state (e.g., awake). In particular, CR 522 may provide one or more indications corresponding to albums that the artist has released, and concerts in which the artist is playing or has played in, among other information corresponding to the artist. Additionally or alternatively, the computing device may cause one or more social media service providers to provide social media updates corresponding to the artist on one or more social media accounts of the individual.

Other examples relating to discovery of media content and tailored advertisements are possible. In some instances, the computing device may determine that the individual consistently reacts positively to media content from a particular artist. After providing such biometric data to one or more media service providers, the computing device may receive advertisement content corresponding to another artist that shares similar qualities with the particular artist. Additionally or alternatively, the computing device may receive advertisement content corresponding to another artist that the individual tends to react positively to based on the individual's biometric profile or user profile (e.g., biometric data history).

In some embodiments, the computing device may repeatedly provide, to a media service provider, biometric data representing one or more biological characteristics of an individual or correlated data of the listening state of the individual and the one or more first biological characteristics of the individual. In some cases, such provision may be continual during a period of time (e.g., while a individual is in a certain location (e.g., their home) or while they are using a certain device (e.g., their media playback system). Repeatedly providing such biometric data or correlated data to the media service provider may allow the computing device to provide valuable, real-time insights to the media service provider.

In example operations, an individual may be playing a particular media content in the household. The particular media content may correspond to a particular media service provider. Based on the biometric or correlated biometric data that is continually being provided to the media service provider, the media service provider may determine that the individual is having a positive response to the particular media content that is playing in the household. Alternatively, the computing device may determine and provide the media service with an indication that the individual is having a positive response to the particular media content that is playing in the household. In response, the computing device may cause the media service provider to indicate that the individual is having a positive response to the particular media content that is playing. In some instances, the media service provider may provide such an indication by providing a "thumbs up" indication corresponding to the particular media content.

In other embodiments, the computing device may provide normalized biometric data to the media service provider based on a time domain. The normalized biometric data may disambiguate noise within the biometric data by taking into account of previous biometric data associated with previous media content, along with the current biometric data associated with current media content that is being played by an individual.

In example operations, an individual might have provided a high rating or a "thumbs up" indication corresponding to the current media content that is playing. The individual, however, might have provided a high rating or a "thumbs up" indication corresponding to the previous four media content that were playing. Based on the individual's actions associated with the current and previous media content, the computing device may determine that the individual is perhaps in a good mood and might be providing such a high rating or a "thumbs up" indication in response to the individual's mood. Based on such determination, the computing device may provide normalized biometric data to the media service provider so that the media service provider does not extract too much information from the individual's high rating or "thumbs up" indication corresponding to the current or previous four media content.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising receiving first biometric data representing one or more first biological characteristics of an individual during a first time period; correlating the one or more first biological characteristics of the individual with a listening state of the individual; receiving second biometric data representing one or more second biological characteristics of the individual during a second time period, wherein the first time period precedes the second time period; determining that the one or more second biological characteristics corresponds to the one or more first biological characteristics; and based on the determination, initiating a playback setting corresponding to the listening state of the individual that was correlated with the one or more first biological characteristics of the individual.

(Feature 2) The method of feature of any preceding feature, wherein receiving the first biometric data representing the one or more first biological characteristics of the individual during the first time period comprises receiving, via the computing device over a network interface from one or more wearable computing devices, data corresponding to at least one of following: (i) blood pressure, (ii) pulse, (iii) perspiration; (iv) blood oxygen level, (v) an accelerometer, (vi) a gyroscope, (vii) an electrocardiogram, (viii) electromyography, or (ix) temperature.

(Feature 3) The method of feature of any preceding feature, wherein receiving the first biometric data representing the one or more first biological characteristics of the individual during the first time period comprises: detecting, via one or more sensors of the computing device, data corresponding to at least one of following: (i) Wi-Fi, (ii) Bluetooth, (iii) a millimeter wave scanner, (iv) an infrared laser, (v) electromagnetic radiation, (vi) a camera, (vii) a microphone, (viii) temperature, or (ix) perspiration.

(Feature 4) The method of feature of any preceding feature, wherein receiving the first biometric data representing the one or more first biological characteristics of the individual during the first time period comprises: receiving, via the computing device, data corresponding to a social media account of the individual, wherein the data comprises social media updates of the individual; and wherein correlating the one or more first biological characteristics of the individual with the listening state of the individual comprises: determining, via the computing device, the listening state based on content of the social media updates of the individual.

(Feature 5) The method of feature of any preceding feature, wherein correlating the one or more first biological characteristics of the individual with the listening state of the individual comprises: correlating, via the computing device, the one or more first biological characteristics of the individual with the listening state of the individual in a user profile associated with the individual.

(Feature 6) The method of feature of any preceding feature, wherein correlating the one or more first biological characteristics of the individual with the listening state of the individual comprises: determining the listening state based at least on one of the following: (i) a current playback setting of one or more playback devices, (ii) weather, (iii) time of day, (iv) an event, or (v) a social media account associated with the individual.

(Feature 7) The method of feature of any preceding feature, wherein correlating the one or more first biological characteristics of the individual with the listening state of the individual comprises: determining the listening state based at least on (i) a level of activity of the individual in a given environment in which one or more playback devices are playing back media, or (ii) a noise level of the given environment.

(Feature 8) The method of feature of any preceding feature, wherein correlating the one or more first biological characteristics of the individual with the listening state of the individual comprises: determining a current mood of the individual based on the one or more first biological characteristics; and correlating the current mood of the individual with the listening state.

(Feature 9) The method of feature of any preceding feature, further comprising: before receiving the first biometric data representing the one or more first biological characteristics of the individual during the first time period, causing, via the computing device, one or more playback devices to play back audio in a given environment, wherein determining the current mood of the individual based on the one or more first biological characteristics comprises: determining the current mood of the individual based on one or more audio characteristics of the audio that is being played in the given environment.

(Feature 10) The method of feature of any preceding feature, further comprising: after correlating the one or more first biological characteristics of the individual with the listening state of the individual, causing, via the computing device, a cloud computing system to store the correlated data in a user profile corresponding to the individual.

(Feature 11) The method of feature of any preceding feature, wherein initiating the playback setting corresponding to the listening state of the individual that was correlated with the one or more first biological characteristics of the individual comprises: causing, via the computing device, one or more playback devices to play back audio in a given environment, wherein the audio corresponds to the listening state of the individual that was correlated with the one or more first biological characteristics of the individual.

(Feature 12) The method of feature of any preceding feature, wherein correlating the one or more first biological characteristics of the individual with the listening state of the individual comprises determining that the individual is in either (a) an attentive listening state or (b) an inattentive listening state.

(Feature 13) The method of feature of any preceding feature, wherein the second biometric data indicates that the individual is asleep in a given environment, and wherein initiating the playback setting corresponding to the listening state of the individual comprises: preventing, via the computing device, one or more playback devices from playing back audio in the given environment.

(Feature 14) The method of feature of any preceding feature, wherein initiating the playback setting corresponding to the listening state of the individual that was correlated with the one or more first biological characteristics of the individual comprises: sending, via the computing device to a media service provider, a request for an audio track corresponding to the listening state of the individual that was correlated with the one or more first biological characteristics of the individual; receiving, via the computing device from the media service provider, the requested audio track corresponding to the listening state of the individual that was correlated with the one or more first biological characteristics of the individual; and based on the received audio tracks corresponding to the listening state of the individual that was correlated with the one or more first biological characteristics of the individual, causing, via the computing device, one or more playback devices to play back the audio track in the given environment.

(Feature 15) The method of feature of any preceding feature, wherein before receiving the first biometric data representing the one or more first biological characteristics of the individual during the first time period, causing, via the computing device, one or more playback devices to play back audio in a given environment, and wherein initiating the playback setting corresponding to the listening state of the individual that was correlated with the one or more first biological characteristics of the individual comprises: sending, via the computing device to a media service provider, data corresponding to the listening state of the individual that was correlated with the one or more first biological characteristics of the individual to cause the media service provider to update a status associated with the audio being played in the given environment in accordance with the listening state of the individual that was correlated with the one or more first biological characteristics of the individual.

(Feature 16) A tangible, non-transitory computer-readable medium having stored therein instructions executable by one or more processors to cause a device to perform the method of any of features 1-15.

(Feature 17) A device configured to perform the method of any of features 1-15.

(Feature 18) A media playback system configured to perform the method of any of features 1-15.

(Feature 19) A cloud computing system configured to perform the method of any of features 1-15.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. Tangible, non-transitory, computer-readable media having instructions encoded therein, wherein the instructions, when executed by one or more processors, cause a system comprising a mobile device and a wearable playback device to perform functions, the functions comprising:

the system receiving input data representing instructions to correlate one or more first playback settings with an attentive listening state, wherein the wearable playback device is operable according to (a) the one or more first playback settings when biometric data indicates an attentive listening state or (b) one or more second playback settings when biometric data indicates an inattentive listening state;

the system receiving biometric data representing one or more biological characteristics of a user at a first time;

the system receiving data representing user input received via a control interface of the wearable playback device, the user input corresponding to one or more playback commands;

the system receiving data representing one or more environmental characteristics at the first time;

the system determining that the user is in the attentive listening state at the first time based on (i) the one or more biological characteristics of the user represented in the biometric data and (ii) the one or more environmental characteristics; and based on the determination, the received data representing the user input, and the instructions, the system initiating the one or more first playback settings on the wearable playback device corresponding to the attentive listening state of the user, wherein initiating the one or more first playback settings comprises playing back particular audio content via one or more audio transducers of the wearable playback device, wherein the wearable playback device comprises a first housing carrying the one or more audio transducers and a first wireless network interface connected to a wireless network, and wherein the mobile device comprises a second housing carrying a second wireless network interface connected to the wireless network.

2. The tangible, non-transitory computer-readable medium of claim 1, wherein the functions further comprise:

receiving location data indicating a location of the user relative to a zone of a zone-based media playback system comprising one or more zones comprising respective devices connected to a local area network, and wherein initiating the one or more first playback settings on the wearable playback device comprises initiating a particular playback setting corresponding to the attentive listening state of the user and the location of the user relative to the zone of the zone-based media playback system.

3. The tangible, non-transitory computer-readable medium of claim 2, wherein the location data indicates that the user is in a first zone of the zone-based media playback system, and wherein initiating the one or more first playback settings corresponding to the attentive listening state of the user and the location of the user relative to the one or more zones comprises initiating playback of a particular playlist corresponding to (i) attentive listening and (ii) the first zone, wherein the first zone comprises one or more first devices connected to the local area network.

4. The tangible, non-transitory computer-readable medium of claim 2, wherein the location data indicates that the user is outside of the one or more zones of the zone-based media playback system, and wherein initiating the one or more first playback settings corresponding to the attentive listening state of the user and the location of the user relative to the one or more zones comprises initiating playback of a particular playlist corresponding to (i) attentive listening and (ii) locations outside of the one or more zones of the zone-based media playback system.

5. The tangible, non-transitory computer-readable medium of claim 1, wherein initiating the one or more first playback settings corresponding to the attentive listening state of the user comprises initiating playback of a particular playlist of audio tracks stored in data storage of the wearable playback device.

6. The tangible, non-transitory computer-readable medium of claim 1, wherein receiving the biometric data representing the one or more biological characteristics of the user comprises:

receiving, by the mobile device from one or more wearable computing devices, data corresponding to at least one of following: (i) blood pressure, (ii) pulse, (iii) perspiration; (iv) blood oxygen level, (v) an accelerometer, (vi) an electrocardiogram, (vii) electromyography, or (viii) body temperature.

7. The tangible, non-transitory computer-readable medium of claim 1, wherein the one or more biological characteristics are one or more second biological characteristics, and wherein the functions further comprise:
before determining that the one or more second biological characteristics of the user correspond to the attentive listening state of the user, the system correlating one or more first biological characteristics of the user with the attentive listening state of the user.

8. A method to be performed by a system comprising a mobile device and a wearable playback device, the method comprising:
the system receiving input data representing instructions to correlate one or more first playback settings with an attentive listening state, wherein the wearable playback device is operable according to (a) the one or more first playback settings when biometric data indicates an attentive listening state or (b) one or more second playback settings when biometric data indicates an inattentive listening state;
the system receiving biometric data representing one or more biological characteristics of a user at a first time;
the system receiving data representing user input received via a control interface of the wearable playback device, the user input corresponding to one or more playback commands;
the system receiving data representing one or more environmental characteristics at the first time;
the system determining that the user is in the attentive listening state at the first time based on (i) the one or more biological characteristics of the user represented in the biometric data and (ii) the one or more environmental characteristics; and
based on the determination, the received data representing the user input, and the instructions, the system initiating the one or more first playback settings on the wearable playback device corresponding to the attentive listening state of the user, wherein initiating the one or more first playback settings comprises playing back particular audio content via one or more audio transducers of the wearable playback device, wherein the wearable playback device comprises a first housing carrying the one or more audio transducers and a first wireless network interface connected to a wireless network, and wherein the mobile device comprises a second housing carrying a second wireless network interface connected to the wireless network.

9. The method of claim 8, further comprising:
receiving location data indicating a location of the user relative to a zone of a zone-based media playback system comprising one or more zones comprising respective devices connected to a local area network, and wherein initiating the one or more first playback settings on the wearable playback device comprises initiating a particular playback setting corresponding to the attentive listening state of the user and the location of the user relative to the zone of the zone-based media playback system.

10. The method of claim 9, wherein the location data indicates that the user is in a first zone of the zone-based media playback system, and wherein initiating the one or more first playback settings corresponding to the attentive listening state of the user and the location of the user relative to the one or more zones comprises initiating playback of a particular playlist corresponding to (i) attentive listening and (ii) the first zone, wherein the first zone comprises one or more first devices connected to the local area network.

11. The method of claim 9, wherein the location data indicates that the user is outside of the one or more zones of the zone-based media playback system, and wherein initiating the one or more first playback settings corresponding to the attentive listening state of the user and the location of the user relative to the one or more zones comprises initiating playback of a particular playlist corresponding to (i) attentive listening and (ii) locations outside of the one or more zones of the zone-based media playback system.

12. The method of claim 8, wherein initiating the one or more first playback settings corresponding to the attentive listening state of the user comprises initiating playback of a particular playlist of audio tracks stored in data storage of the wearable playback device.

13. The method of claim 8, wherein receiving the biometric data representing the one or more biological characteristics of the user comprises:
receiving, by the mobile device from one or more wearable computing devices, data corresponding to at least one of following: (i) blood pressure, (ii) pulse, (iii) perspiration; (iv) blood oxygen level, (v) an accelerometer, (vi) an electrocardiogram, (vii) electromyography, or (viii) body temperature.

14. The method of claim 8, wherein the one or more biological characteristics are one or more second biological characteristics, and wherein the method further comprises:
before determining that the one or more second biological characteristics of the user correspond to the attentive listening state of the user, the system correlating one or more first biological characteristics of the user with the attentive listening state of the user.

15. A system comprising:
a mobile device comprising:
a network interface connected to a wireless network; and
a housing carrying the network interface;
a wearable playback device comprising:
a network interface connected to the wireless network;
one or more audio transducers; and
a housing carrying the network interface and the one or more audio transducers;
one or more processors;
data storage storing instructions that when executed by the one or more processors cause the system to perform functions comprising:
the system receiving input data representing instructions to correlate one or more first playback settings with an attentive listening state, wherein the wearable playback device is operable according to (a) the one or more first playback settings when biometric data indicates an attentive listening state or (b) one or more second playback settings when biometric data indicates an inattentive listening state;
the system receiving biometric data representing one or more biological characteristics of a user at a first time;
the system receiving data representing user input received via a control interface of the wearable playback device, the user input corresponding to one or more playback commands;
the system receiving data representing one or more environmental characteristics at the first time;
the system determining that the user is in the attentive listening state at the first time based on (i) the one or more biological characteristics of the user represented in the biometric data and (ii) the one or more environmental characteristics; and
based on the determination, the received data representing the user input, and the instructions, the system initiating the one or more first playback settings on the wearable playback device corresponding to the attentive listening state of the user, wherein initiating the one or more first playback settings comprises playing back particular audio content.

16. The system of claim 15, wherein the functions further comprise:
receiving location data indicating a location of the user relative to a zone of a zone-based media playback system comprising one or more zones comprising respective devices connected to a local area network, and wherein initiating the one or more first playback settings on the wearable playback device comprises initiating a particular playback setting corresponding to the attentive listening state of the user and the location of the user relative to the zone of the zone-based media playback system.

17. The system of claim 16, wherein the location data indicates that the user is in a first zone of the zone-based media playback system, and wherein initiating the one or more first playback settings corresponding to the attentive listening state of the user and the location of the user relative to the one or more zones comprises initiating playback of a particular playlist corresponding to (i) attentive listening and (ii) the first zone, wherein the first zone comprises one or more first devices connected to the local area network.

18. The system of claim 16, wherein the location data indicates that the user is outside of the one or more zones of the zone-based media playback system, and wherein initiating the one or more first playback settings corresponding to the attentive listening state of the user and the location of the user relative to the one or more zones comprises initiating playback of a particular playlist corresponding to (i) attentive listening and (ii) locations outside of the one or more zones of the zone-based media playback system.

19. The system of claim 15, wherein initiating the one or more first playback settings corresponding to the attentive listening state of the user comprises initiating playback of a particular playlist of audio tracks stored in data storage of the wearable playback device.

20. The system of claim 15, wherein receiving the biometric data representing the one or more biological characteristics of the user comprises:
receiving, by the mobile device from one or more wearable computing devices, data corresponding to at least one of following: (i) blood pressure, (ii) pulse, (iii) perspiration; (iv) blood oxygen level, (v) an accelerometer, (vi) an electrocardiogram, (vii) electromyography, or (viii) body temperature.

21. The tangible, non-transitory computer-readable medium of claim 1, wherein the functions further comprise:
the system receiving additional biometric data representing one or more biological characteristics of the user at a second time;
the system determining that the one or more biological characteristics of the user at the second time correspond to the inattentive listening state of the user; and
based on the determination and the instructions, the system initiating one or more second playback settings on the wearable playback device corresponding to the inattentive listening state of the user, wherein initiating the one or more second playback settings comprises playing back particular second audio content via one or more audio transducers of the wearable playback device.

22. The tangible, non-transitory computer-readable medium of claim 21, wherein initiating the one or more first playback settings comprises applying a first equalization to playback by the wearable playback device, and wherein the initiating the one or more second playback settings comprises applying a second equalization to playback by the wearable playback device.

23. The tangible, non-transitory computer-readable medium of claim 21, wherein initiating the one or more first playback settings comprises applying a first volume setting to playback by the wearable playback device, and wherein the initiating the one or more second playback settings comprises applying a second volume setting to playback by the wearable playback device.

24. The tangible, non-transitory computer-readable medium of claim 1, wherein receiving data representing one or more environmental characteristics at the first time comprises receiving microphone data indicating that ambient noise surrounding the wearable playback device is below a threshold, and wherein initiating the one or more first playback settings based on the determination, the received data representing the user input, and the instructions comprises initiating the one or more first playback settings at least partially based on the ambient noise being below the threshold.

* * * * *